United States Patent [19]

Stoker

[11] Patent Number: 5,764,284

[45] Date of Patent: Jun. 9, 1998

[54] SYSTEM AND METHOD FOR MEASURING THE FIDELITY OF VIDEO

[75] Inventor: Edward J. Stoker, Plano, Tex.

[73] Assignee: MCI Corporations, Washington, D.C.

[21] Appl. No.: 670,866

[22] Filed: Jun. 26, 1996

[51] Int. Cl.$^6$ .................................................. H04N 17/00
[52] U.S. Cl. ...................................... 348/181; 348/192
[58] Field of Search .................................. 348/181, 192, 348/184, 180, 193, 190, 189; H04N 17/00

[56] References Cited

U.S. PATENT DOCUMENTS

| | | | |
|---|---|---|---|
| 4,894,718 | 1/1990 | Hung | 348/181 |
| 4,985,901 | 1/1991 | Cohen et al. | 348/180 |
| 5,010,403 | 4/1991 | Wardzala | 348/180 |
| 5,614,944 | 3/1997 | Taura et al. | 348/181 |

*Primary Examiner*—Victor R. Kostak

[57] ABSTRACT

A system and method for measuring and evaluating video fidelity. A test video signal is transmitted over a baseline system under test (SUT). A reference video signal is delayed by an amount equal to a latency of the baseline SUT. The test video signal and the reference video signal were previously generated from a common source. The transmitted test video signal is synchronized with the delayed reference video signal, and the synchronized test video signal and the synchronized reference video signal are digitized. The digitized test video signal is inverted, and the digitized reference video signal and the inverted test video signal are summed to thereby generate a video fidelity value of the baseline SUT. A subjective determination is then made as to whether the transmitted test video signal is adequate. If the transmitted test video signal is adequate, then the video fidelity value of the baseline SUT as established as the baseline video fidelity value. Thereafter, the respective fidelities of other SUTs are evaluated with reference to the baseline video fidelity value.

16 Claims, 4 Drawing Sheets

SYSTEM AND METHOD FOR MEASURING THE FIDELITY OF VIDEO

BACKGROUND OF THE INVENTION

1. Field of the invention

The present invention relates generally to video signals, and more particularly to a system and method for measuring the fidelity of video signals.

2. Related Art

The transmission of a video signal over a transmission path is subject to distortion caused by any of the devices in the transmission path. The potential for distortion increases as the number of devices in the transmission path increases.

Consider the transmission of video signals over existing voice telephony lines. Video phones, for example, operate using this communication medium. Video signals transmitted over this communication medium are subject to a limited bandwidth (less than 4 K(Hz) and, therefore, a limited data rate for carrying image information. Consequently, the transmission path must include compression devices to provide a reasonable image quality and refresh rate. The transmission path also includes a number of other devices, such as echo cancelers, channel banks, image receptors, encoders, decoders, etc. Any of these devices may distort the video signals.

Of course, in the ideal world, the devices in the transmission path would faithfully render rapidly changing video images (i.e., the devices would not distort the video signals). This ideal world does not currently exist.

However, video technology is improving. Such advancement in video technology would be aided by some means of measuring the video fidelity of the devices in the video transmission path (i.e., for quantifying the distortion introduced by the devices in the video transmission path). It would then be possible to track the advances in video technology by comparing the respective video fidelities of successive generations of video processing devices.

SUMMARY OF THE INVENTION

Briefly stated, the present invention is directed to a system and method for measuring and evaluating video fidelity. The invention operates by generating a test video signal and a reference video signal from a common source. The test video signal is transmitted over a baseline system under test (SUT). The reference video signal is delayed by an amount equal to a latency of the baseline SUT. The transmitted test video signal is synchronized with the delayed reference video signal, and the synchronized test video signal and the synchronized reference video signal are digitized. The digitized test video signal is inverted, and the digitized reference video signal and the inverted test video signal are summed to thereby generate a video fidelity value of the baseline SUT. A subjective determination is made as to whether the transmitted test video signal is adequate. If the transmitted test video signal is adequate, then the video fidelity value of the baseline SUT is established as the baseline video fidelity value. Thereafter, the respective fidelities of other SUTs are evaluated with reference to the baseline video fidelity value.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF PREFERRED EMBODIMENTS

Figure 1:
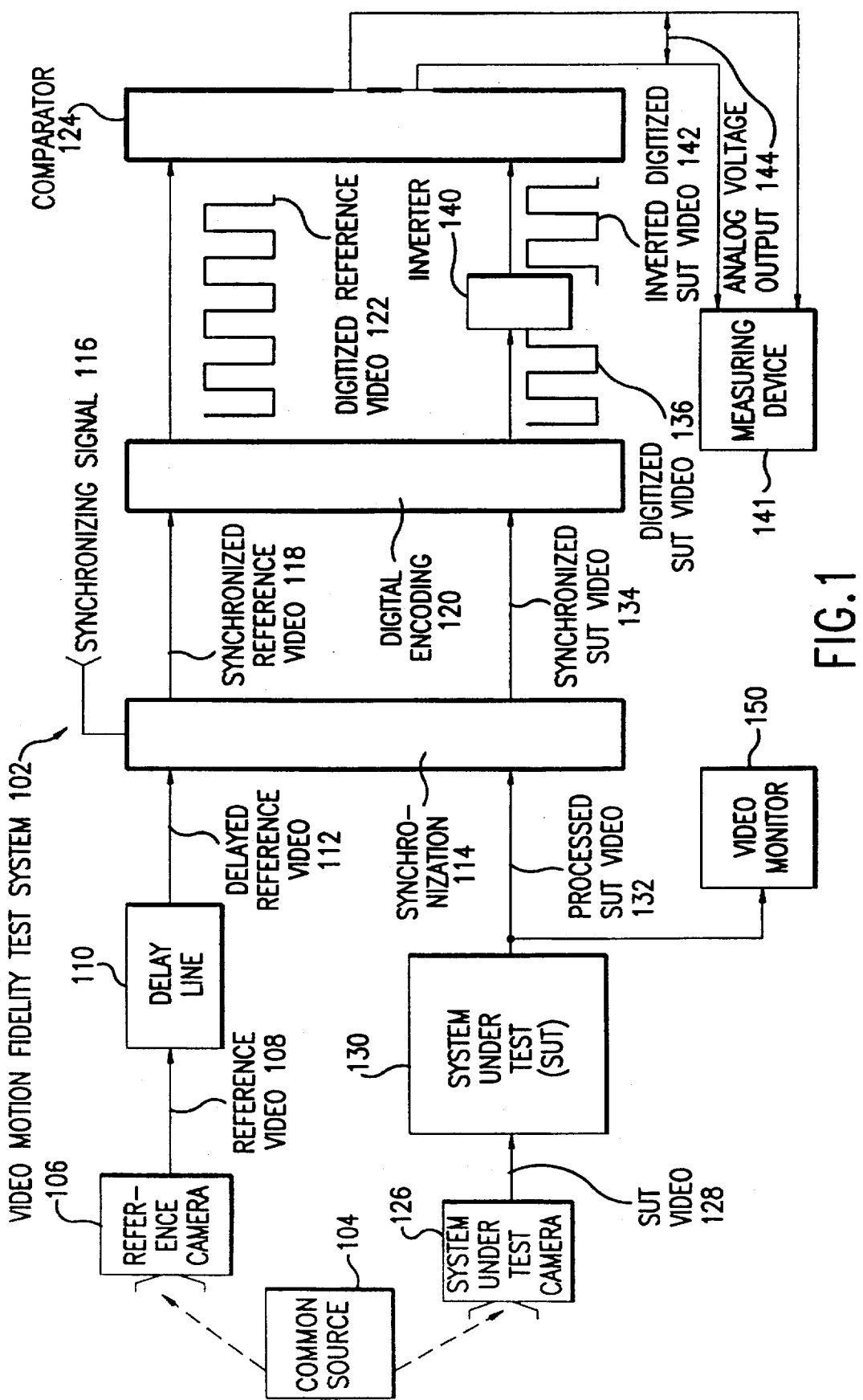
FIG. 1 is a block diagram of a video motion fidelity test system according to a preferred embodiment of the present invention.

The present invention is directed to a system and method for measuring the fidelity of video signals. More particularly, the invention is directed to a system and method for comparatively evaluating the video fidelity of devices in a transmission path over which video signals are transmitted. The present invention quantifies the degree to which the devices in the transmission path distort video signals that are transmitted over the transmission path.

The invention operates generally as follows. A video signal is transmitted over a video transmission path contained in a system under test (SUT). For reference purposes, this SUT is called the baseline SUT. The video fidelity of the video signal after it exits the baseline SUT is measured. The value resulting from this measurement is called the video fidelity value of the baseline SUT. The video signal after transmission over the baseline SUT is then subjectively evaluated, typically by a human attendant who views the video signal. If the video signal is judged to be adequate, then the video fidelity value of the baseline SUT is established as a baseline video fidelity value.

The respective video fidelity values of other SUTs are then determined and judged against the baseline video fidelity value. For reference purposes, these other SUTs are called sample SUTs. The structure of the sample SUTs must be comparable to that of the baseline SUT. Specifically, the video transmission paths in the sample SUTs and the baseline SUT must be similar, i.e., they must have the same number and type of devices.

The smaller the difference between a sample SUT's video fidelity value and the baseline video fidelity value, the less distortion the sample SUT is considered to introduce. Conversely, the greater the difference between a sample SUT's video fidelity value and the baseline video fidelity value, the more distortion the sample SUT is considered to introduce. In other words, according to the present invention, if a sample SUT has a video fidelity value that closely corresponds to the baseline video fidelity value, then the sample SUT is considered to render rapidly changing video images in an acceptable manner.

The invention shall now be described in greater detail with reference to FIG. 1, which illustrates a video motion fidelity test system 102 according to a preferred embodiment of the present invention. The test system 102 shall be described with reference to a flowchart 202 in FIG. 2. Flowchart 202 represents the manner in which the test system 102 establishes the baseline video fidelity value. Flowchart 202 begins with step 204, where control immediately passes to step 206.

In step 206, a reference camera 106 samples a common source 104 to thereby generate a reference video signal 108.

Also, a SUT camera 126 simultaneously samples the common source 104 to thereby generate a SUT video signal 128 (also called the test video signal 128). The reference camera 106 and the SUT camera 126 are any well known video cameras capable of generating well known NTSC (National Television System Committee) signals. As will be appreciated, NTSC signals are standard analog television signals and include 30 frames per second. The reference video signal 108 and the SUT video signal 128 are standard NTSC signals, i.e., standard television signals. In other embodiments, alternative signal forms could be utilized.

Figure 5:
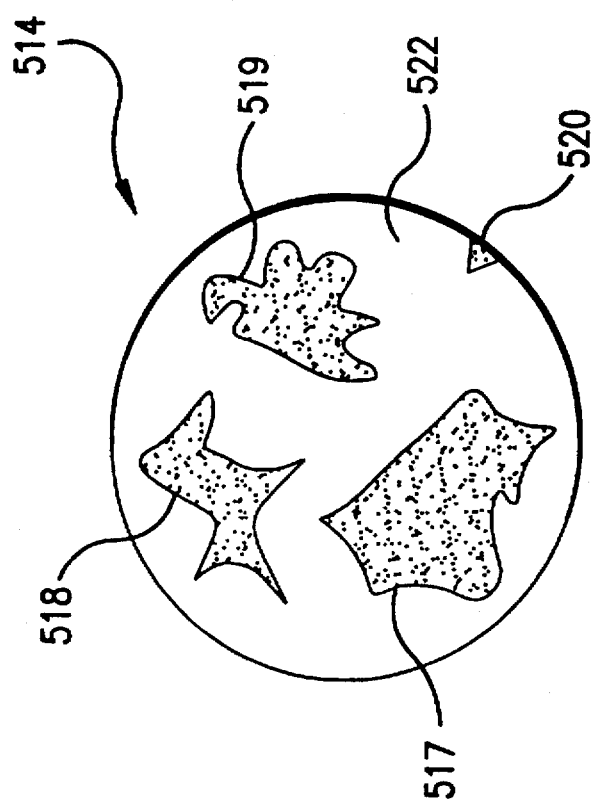
FIGS. 4 and 5 are examples of common video sources.
Figure 4:
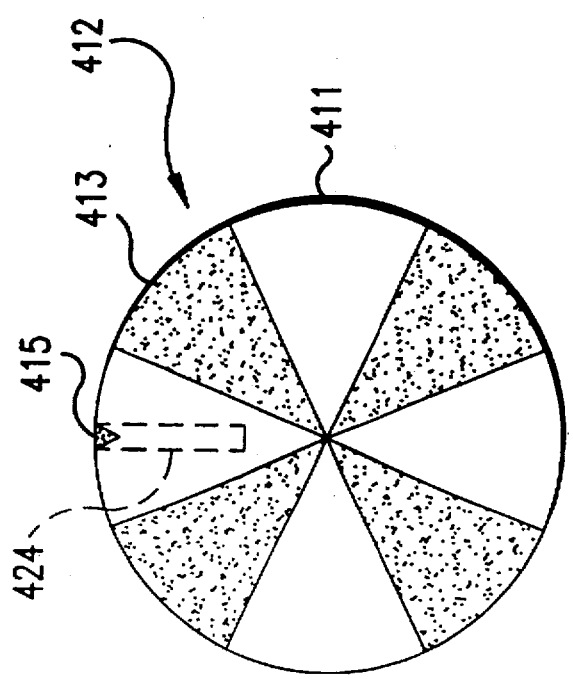

The common source 104 is a visual stimulation device. It is engineered to provide maximum visual excitation. Preferably, the common source 104 is a rotating test pattern assembly. Referring to FIGS. 4 and 5, the rotating test pattern assembly 104 comprises a test pattern 412 or 514 printed on a disk. The disk is driven in rotation by a speed-controlled motor (not shown). The speed of the motor may be automatically controlled by a test controller (not shown), or it may be manually controlled by a human test operator manipulating a speed controller (not shown). Pattern 412 comprises alternating light and dark pie-shaped segments 411 and 413, respectively. Pattern 514 comprises on a light background multiple dark asymmetric shapes 517, 518, and 519, each having a different shape.

Test patterns other than the symmetrical pattern 412 or the asymmetric pattern 514 may be printed on the disk. Although black and white patterns are preferred for their contrast, a plurality of other colors may be employed instead, as long as the required contrast is provided between adjacent colors. The number of pie-shaped segments in pattern 412 and the number of dark shapes in pattern 514 may also be varied from at least 3, preferably 6 to 20, and more preferably 8 to 16. The pie-shaped segments are preferably in alternating colors such that there is a shape contrast between adjacent segments. The colors preferred are black and white.

An index mark 415, 520 is on the front of each pattern 412 and 514. This mark is particularly important where the disk pattern is symmetrical, as with the pattern 412, so that each full revolution of the disk may be observed, thus allowing the counting of the number of incremental jumps in the video picture image per revolution of the disk.

The size of the rotating disk pattern should be sufficient to fill substantially the entire visual field of the cameras 106, 126. For conventional cameras, the diameter of the disk pattern is preferably 10 to 50 inches, more preferably 20 to 40 inches, and most preferably about 30 inches. Of course, the diameter of the disk pattern will vary and will depend on the cameras actually used.

The common source 104 is further described in pending U.S. Patent Application entitled "Rotating Visual Display for Video Testing," Ser. No. 08/530,635, filed Sep. 20, 1995, MCI Ref. No. RIC-95-058, which is incorporated herein by reference in its entirety.

Referring again to FIG. 2, in step 208 the SUT video signal 128 is injected into a SUT 130, which for purposes of the present discussion is called the baseline SUT 130. The baseline SUT 130 includes a transmission path. The SUT video signal 128 traverses this transmission path.

The transmission path of the baseline SUT 130 includes a configuration of devices, such as any combination of compression devices, echo cancelers, channel banks, image receptors, encoders, and/or decoders. The baseline video fidelity value being determined during the processing of flowchart 202 is specific to this configuration of devices.

Preferably, a baseline video fidelity value is determined (by performing flowchart 202) for each substantially different configuration of interest (i.e., for each substantially different SUT).

The SUT video signal 128 may be processed, manipulated, or otherwise affected by the devices in the transmission path of the baseline SUT 130. Such processing may distort the SUT video signal 128 to some degree. For reference purposes, the SUT video signal 128 is called the processed SUT video signal 132 after it exits the baseline SUT 130.

Also in step 208, the reference video signal 108 is delayed by a delay line or device 110. Devices for delaying NTSC video signals are well known, and are commercially available. The delay introduced by the delay line 110 is equal or substantially equal to the latency of the baseline SUT 130. This latency is determined in a well known manner. For reference purposes, the reference video signal 108 is called the delayed reference video signal 112 after it exits the delay line 110.

In step 210, the delayed reference video signal 112 and the processed SUT video signal 132 are input to a synchronizer 114. At this point, due to the operation of the delay line 110, the delayed reference video signal 112 and the processed SUT video signal 132 are substantially in synch (i.e., they arrive at the synchronizer 114 at substantially the same time). However, their synchronization may be off by a few frames (i.e., one may arrive a few frames before the other).

Accordingly, in step 210, the synchronizer 114 synchronizes the delayed reference video signal 112 and the processed SUT video signal 132 such that they are frame synchronized. For reference purposes, at the output of the synchronizer 114, the delayed reference video signal 112 is called the synchronized reference video signal 118 and the processed SUT video signal 132 is called the synchronized SUT video signal 134.

In one embodiment, the synchronizer 114 synchronizes both the delayed reference video signal 112 and the processed SUT video signal 132 to a synchronizing signal 116, also called a gen-locked signal or input. In another embodiment, the synchronizer 114 synchronizes the delayed reference video signal 112 to the processed SUT video signal 132, or vice versa. NTSC synchronizers are commercially available. For example, NTSC synchronizers are commercially available from Leitch Incorporated, Chesapeake, Va. An example NTSC synchronizer that can be used with the invention is NTSC/D2 Digital Frame Synchronizer, DFS-3002N, Leitch Incorporated, Chesapeake, Va. Other types of NTSC synchronizers or functionally similar devices could alternatively be used.

In step 212, the synchronized reference video signal 118 and the synchronized SUT video signal 134, which are both analog signals, are digitized by an analog-to-digital converter 120. The invention assumes that all or substantially all of the information contained in the synchronized reference video signal 118 and the synchronized SUT video signal 134 is retained in the resulting digitized signals. The converter 120 preferably has a wide passband to accommodate the synchronized reference video signal 118 and the synchronized SUT video signal 134. Such analog-to-digital converters are well known and are commercially available. For reference purposes, at the output of the converter 120, the synchronized reference video signal 118 is called the digitized reference video signal 122 and the synchronized SUT video signal 134 is called the digitized SUT video signal 136.

Figure 2:
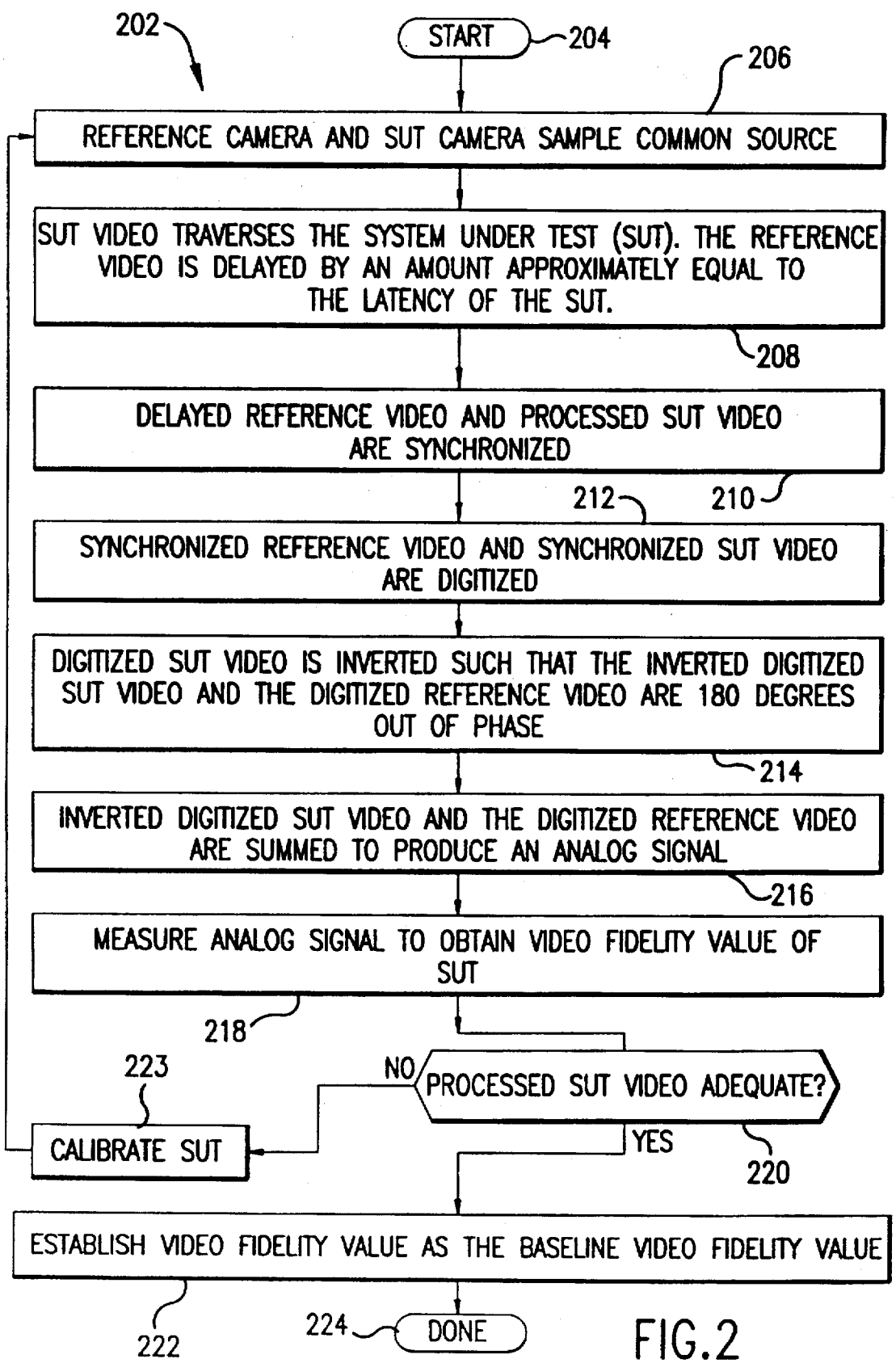
FIGS. 2 and 3 are flowcharts representing the preferred operation of the present invention.

As depicted in FIG. 1, the digitized reference video signal 122 and the digitized SUT video signal 136 are in phase. In step 214, the digitized SUT video signal 136 is input to a well known inverter 140, which inverts the digitized SUT video signal 136 by 180 degrees. For reference purposes, at the output of the inverter 140, the digitized SUT video signal 136 is called the inverted digitized SUT video signal 142. As depicted in FIG. 1, the inverted digitized SUT video signal 142 and the digitized reference video signal 122 are 180 degrees out of phase with each other.

In step 216, the inverted digitized SUT video signal 142 and the digitized reference video signal 122 are applied to a well known comparator 124. The comparator 124 is a digital summing device having an analog output. The comparator 124 sums the inverted digitized SUT video signal 142 and the digitized reference video signal 122. The difference between the inverted digitized SUT video signal 142 and the digitized reference video signal 122 is represented as an analog voltage output 144. In step 218, the amplitude of the analog voltage output 144 is measured by a measuring device 146, which may be a well known voltmeter or oscilloscope. The value resulting from this measurement is called the video fidelity value of the baseline SUT 130.

If the baseline SUT 130 did not distort the SUT video signal 128, then the inverted digitized SUT video signal 142 would be the same as or substantially the same as the digitized reference video 122 (although they would be 180 degrees out of phase with each other). Consequently, the analog voltage output 144 would be 0 or near 0. If, instead, the baseline SUT 130 distorted the SUT video signal 128, then the inverted digitized SUT video signal 142 would not be the same as the digitized reference video 122. Thus, the analog voltage output 144 would be a value greater than zero. Generally speaking, the greater the analog voltage output 144, the greater the distortion introduced by the baseline SUT 130.

As will be appreciated, the video fidelity of the processed SUT video 132 at the output of the baseline SUT 130 is a subjective evaluation. A person viewing the processed SUT video signal 132 on a video monitor 150 may decide that the fidelity of the processed SUT video signal 132 is good or bad, irrespective of the video fidelity value of the baseline SUT 130. Thus, the video fidelity value of the baseline SUT 130 must be evaluated based on subjective criteria. This is done in step 220.

Specifically, in step 220 a human attendant views the processed SUT video signal 132 on the video monitor 150. If the human attendant subjectively believes that the processed SUT video signal 132 is adequate, then step 222 is performed. In step 222, the video fidelity value of the baseline SUT 130 is established as the baseline video fidelity value. This baseline video fidelity value is preferably applicable to any SUT having the same or substantially the same configuration as the baseline SUT 130. The baseline video fidelity value may be stored in a database, for example. Flowchart 202 is complete after step 222 is performed, as indicated by step 224.

If, in step 220, the human attendant does not believe that the processed SUT video signal 132 is adequate, then step 223 is performed. In step 223, the baseline SUT 130 is calibrated (by the human attendant or through other well known means). Such calibration may include adjusting in a well known manner the devices in the video transmission path of the baseline SUT 130. It should be understood, however, that the nature of the calibration is implementation specific, and is dependent on the particular configuration of the baseline SUT 130. Control flows to step 206 after step 223 is performed.

Figure 3:
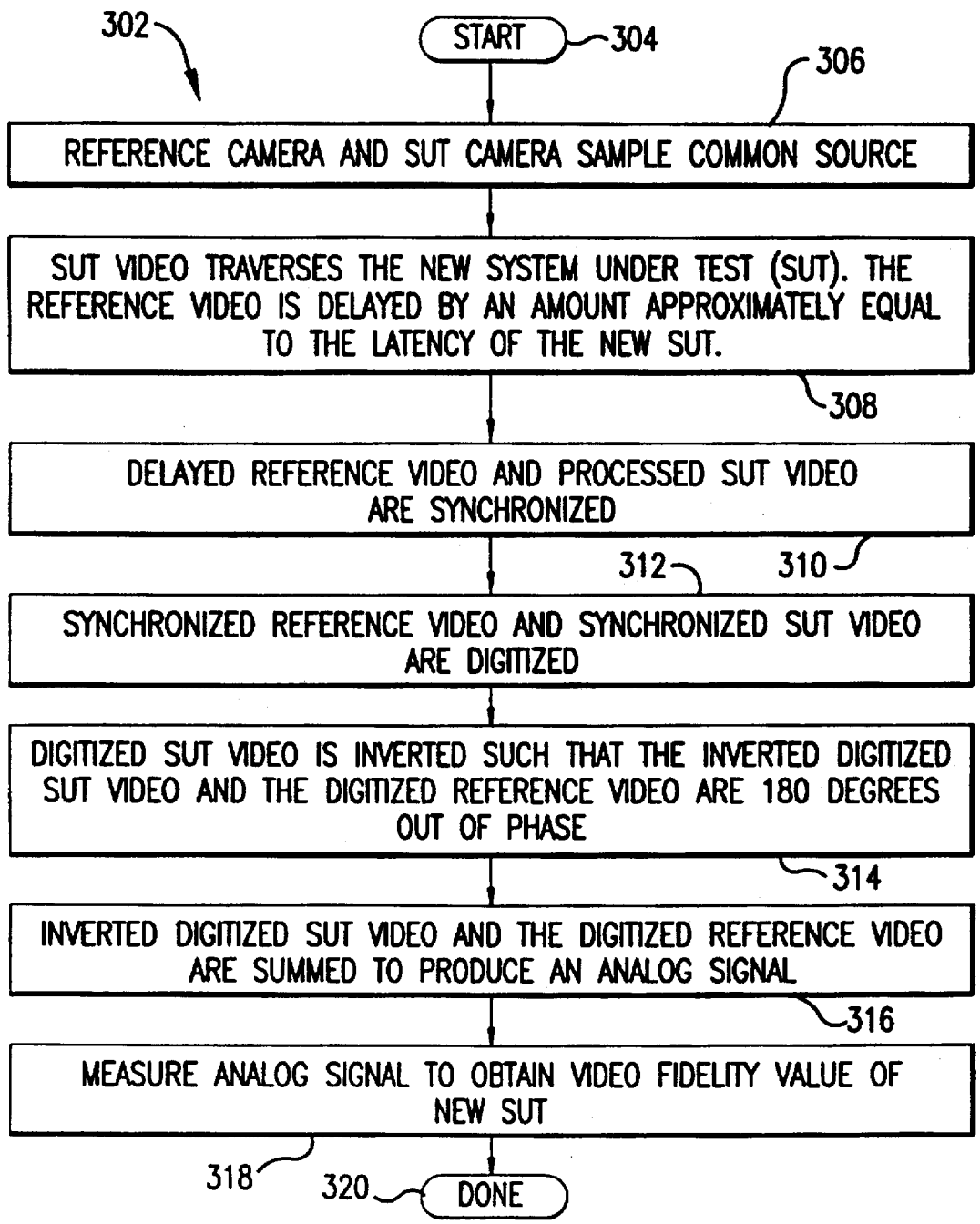

FIG. 3 is a flowchart 302 representing the manner in which the respective video fidelities of other SUTs are determined. These other SUTs are called sample SUTs for reference purposes. Flowchart 302 begins with step 304, where control immediately passes to step 306.

In step 306, the reference camera 106 samples the common source 104 to thereby generate a reference video signal 108. Also, the SUT camera 126 simultaneously samples the common source 104 to thereby generate the SUT video signal 128. Step 306 corresponds to step 206 in FIG. 2.

In step 308, the SUT video signal 128 is injected into a SUT 130. The SUT 130 is not the baseline SUT discussed above. Instead, the SUT 130 is one whose video fidelity is being measured. For reference purposes, the SUT 130 is called the sample SUT 130. Also in step 308, the reference video signal 108 is delayed by the delay line 110. Step 308 is similar to step 208 in FIG. 2.

In step 310, the delayed reference video signal 112 and the processed SUT video signal 132 are input to the synchronizer 114. The synchronizer 114 synchronizes the delayed reference video signal 112 and the processed SUT video signal 132 such that they are frame synchronized. Step 310 is similar to step 210 in FIG. 2.

In step 312, the synchronized reference video signal 118 and the synchronized SUT video signal 134, which are both analog signals, are digitized by the analog-to-digital converter 120. Step 312 is similar to step 212 in FIG. 2.

In step 314, the digitized SUT video signal 136 is input to the well known inverter 140, which inverts the digitized SUT video signal 136 by 180 degrees. Step 314 is similar to step 214 in FIG. 2.

In step 316, the inverted digitized SUT video signal 142 and the digitized reference video signal 122 are applied to the well known comparator 124. The comparator 124 sums the inverted digitized SUT video signal 142 and the digitized reference video signal 122. The difference between the inverted digitized SUT video signal 142 and the digitized reference video signal 122 is represented as an analog voltage output 144. Step 316 is similar to step 216 in FIG. 2.

In step 318, the amplitude of the analog voltage output 144 is measured by the measuring device 146. The value resulting from this measurement is called the video fidelity value of the sample SUT 130.

Also in step 318 (or at a later time), the video fidelity of the sample SUT 130 is evaluated by comparing the video fidelity value of the sample SUT 130 to the corresponding baseline video fidelity value. This baseline video fidelity value is one that is specific to a transmission path configuration that is the same as or substantially similar to that of the sample SUT 130.

If the video fidelity value of the sample SUT 130 is the same as or substantially the same as the baseline video fidelity value, then the video fidelity of the sample SUT 130 is considered to be good. In other words, the sample SUT 130 is considered to cause acceptable or no distortion to the SUT video 128. On the other hand, a significant difference between the video fidelity value of the sample SUT 130 and the baseline video fidelity value indicates that the sample SUT 130 significantly contributes to the distortion of the SUT video 128. The greater the difference between the video fidelity value and the baseline video fidelity value, the more the sample SUT 130 is considered to distort the SUT video 128. Actual values of acceptable differences between the video fidelity value of the sample SUT 130 and the baseline video fidelity value are implementation dependent, and may be empirically determined, for example.

Flowchart 302 is complete after step 318 is performed, as indicated by step 320.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of measuring and evaluating video fidelity, comprising the steps of:
   (1) transmitting a test video signal over a baseline system under test (SUT);
   (2) delaying a reference video signal by an amount equal to a latency of the baseline SUT, the test video signal and the reference video signal having been generated from a common source;
   (3) synchronizing the transmitted test video signal with the delayed reference video signal;
   (4) digitizing the synchronized test video signal and the synchronized reference video signal;
   (5) inverting the digitized test video signal;
   (6) summing the digitized reference video signal and the inverted test video signal to thereby generate a video fidelity value of the baseline SUT;
   (7) subjectively determining whether the transmitted test video signal is adequate;
   (8) if the transmitted test video signal is adequate, then establishing the video fidelity value of the baseline SUT as a baseline video fidelity value; and
   (9) evaluating a fidelity of a sample SUT with reference to the baseline video fidelity value.

2. The method of claim 1, wherein the baseline video fidelity value is applicable to other SUTs which are similar to the baseline SUT.

3. The method of claim 1, wherein step (9) comprises the steps of:
   (a) transmitting a second test video signal over the sample SUT;
   (b) delaying a second reference video signal by an amount equal to a latency of the sample SUT, the second test video signal and the second reference video signal having been generating from the common source;
   (c) synchronizing the transmitted second test video signal with the delayed second reference video signal;
   (d) digitizing the synchronized second test video signal and the synchronized second reference video signal;
   (e) inverting the digitized second test video signal;
   (f) summing the digitized second reference video signal and the inverted second test video signal to thereby generate a video fidelity value of the sample SUT; and
   (g) comparing the video fidelity value of the sample SUT with the baseline video fidelity value to thereby evaluate the fidelity of the sample SUT.

4. The method of claim 3, wherein step (g) comprises the steps of:
   determining that the fidelity of the sample SUT is acceptable if the video fidelity value of the sample SUT is substantially similar to the baseline video fidelity value; and
   determining that the sample SUT distorts the second test video signal if the video fidelity value of the sample SUT differs from the baseline video fidelity value.

5. The method of claim 3, wherein a configuration of the sample SUT is similar to that of the baseline SUT.

6. The method of claim 1, further comprising the steps of:
   (10) if the transmitted test video signal is not adequate, then calibrating the baseline SUT; and
   (11) returning to step (1).

7. The method of claim 1, wherein step (7) comprises the step of:
   displaying the transmitted test video signal on a video monitor to thereby enable a human attendant to view and evaluate the transmitted test video signal.

8. A method of measuring and evaluating video fidelity, comprising the steps of:
   (1) transmitting a test video signal over a sample system under test (SUT);
   (2) delaying a reference video signal by an amount equal to a latency of the sample SUT, the test video signal and the reference video signal having been generated from a common source;
   (3) synchronizing the transmitted test video signal with the delayed reference video signal;
   (4) digitizing the synchronized test video signal and the synchronized reference video signal;
   (5) inverting the digitized test video signal;
   (6) summing the digitized reference video signal and the inverted test video signal to thereby generate a video fidelity value of the baseline SUT; and
   (7) comparing the video fidelity value of the sample SUT with a previously determined baseline video fidelity value to thereby evaluate the fidelity of the sample SUT.

9. The method of claim 8, wherein step (7) comprises the steps of:
   determining that the fidelity of the sample SUT is acceptable if the video fidelity value of the sample SUT is substantially similar to the baseline video fidelity value; and
   determining that the sample SUT distorts the test video signal if the video fidelity value of the sample SUT differs from the baseline video fidelity value.

10. A system of measuring and evaluating video fidelity, comprising:
    transmitting means for transmitting a test video signal over a baseline system under test (SUT);
    delaying means for delaying a reference video signal by an amount equal to a latency of the baseline SUT, the test video signal and the reference video signal having been generated from a common source;
    synchronizing means for synchronizing the transmitted test video signal with the delayed reference video signal;
    digitizing means for digitizing the synchronized test video signal and the synchronized reference video signal;
    inverting means for inverting the digitized test video signal;
    summing means for summing the digitized reference video signal and the inverted test video signal to thereby generate a video fidelity value of the baseline SUT;
    determining means for determining whether the transmitted test video signal is adequate; and establishing means for establishing the video fidelity value of the baseline SUT as a baseline video fidelity value if the transmitted test video signal is adequate.

11. The system of claim 10, further comprising:

evaluating means for evaluating a fidelity of a sample SUT with reference to the baseline video fidelity value.

12. The system of claim 10, wherein the baseline video fidelity value is applicable to other SUTs which are similar to the baseline SUT.

13. The system of claim 11, wherein said evaluating means comprises:

means for transmitting a second test video signal over the sample SUT;

means for delaying a second reference video signal by an amount equal to a latency of the sample SUT, the second test video signal and the second reference video signal having been generating from the common source;

means for synchronizing the transmitted second test video signal with the delayed second reference video signal;

means for digitizing the synchronized second test video signal and the synchronized second reference video signal;

means for inverting the digitized second test video signal;

means for summing the digitized second reference video signal and the inverted second test video signal to thereby generate a video fidelity value of the sample SUT; and comparing means for comparing the video fidelity value of the sample SUT with the baseline video fidelity value to thereby evaluate the fidelity of the sample SUT.

14. The system of claim 13, wherein said comparing means comprises:

means for determining that the fidelity of the sample SUT is acceptable if the video fidelity value of the sample SUT is substantially similar to the baseline video fidelity value; and means for determining that the sample SUT distorts the second test video signal if the video fidelity value of the sample SUT differs from the baseline video fidelity value.

15. The system of claim 13, wherein a configuration of the sample SUT is similar to that of the baseline SUT.

16. The system of claim 10, wherein said determining means comprises:

means for displaying the transmitted test video signal on a video monitor to thereby enable a human attendant to view and evaluate the transmitted test video signal.

* * * * *